United States Patent [19]

Howard

[11] 4,294,327
[45] Oct. 13, 1981

[54] SAFETY INTERLOCK FOR MACHINE AND ENGINE WITH MAGNETO IGNITION

[75] Inventor: William A. Howard, Troy Township, Geauga County, Ohio

[73] Assignee: Delta Systems, Inc., Twinsburg, Ohio

[21] Appl. No.: 969,871

[22] Filed: Dec. 15, 1978

[51] Int. Cl.³ ............................................. B60K 23/00
[52] U.S. Cl. ..................................... 180/273; 56/10.5; 123/198 DC
[58] Field of Search ............... 180/271, 272, 273, 287, 180/290; 123/198 DC; 307/105 B; 56/10.5

[56] References Cited

U.S. PATENT DOCUMENTS

| | | | |
|---|---|---|---|
| 3,229,452 | 1/1966 | Hasenbank | 180/273 |
| 3,626,676 | 12/1971 | Miley et al. | 180/271 |
| 3,726,265 | 4/1973 | Howard | 123/198 DC |
| 3,731,471 | 5/1973 | Bening | 56/10.5 |
| 3,733,794 | 5/1973 | Allen | 56/10.5 |
| 3,736,729 | 6/1973 | Peterson | 56/10.5 |
| 4,033,311 | 7/1977 | Burson | 180/271 |

FOREIGN PATENT DOCUMENTS 52-49530  4/1977  Japan ................................ 180/273

Primary Examiner—Joseph F. Peters, Jr.
Assistant Examiner—O. W. Underwood
Attorney, Agent, or Firm—Watts, Hoffmann, Fisher & Heinke Co.

[57] ABSTRACT

A safety interlock for a vehicle driven through a transmission by an internal combustion engine that has a magneto ignition system and a seat occupied by a driver. The interlock is electrically connected to the ignition and to safety switches, one that is opened when the transmission to a traction drive is engaged and another that is closed when the seat is occupied. The interlock circuit disables the ignition if the engine is not running and the transmission is engaged so the engine cannot be started under unsafe conditions. The engine is also disabled if, after it is running, the seat becomes unoccupied while the transmission is engaged. However, the interlock allows the engine to be started with the seat occupied or not, as long as the transmission is disengaged. One or more safety switches associated with mechanisms driven by the engine can be connected in series with the transmission-operated safety switch to control operation in the same manner.

7 Claims, 2 Drawing Figures

SAFETY INTERLOCK FOR MACHINE AND ENGINE WITH MAGNETO IGNITION

BACKGROUND

1. Field of the Invention

This invention relates to circuits for controlling the operation of internal combustion engine ignition systems that utilize magnetos.

2. Prior Art

U.S. Pat. No. 3,726,265 to William A. Howard, the present inventor, discloses a safety interlock for magneto ignition engines and their related machines. The interlock circuit utilizes a first electronic control to short or ground the primary winding of the magneto when a transmission-operated switch indicates the transmission of an associated machine is in an unsafe condition for starting the engine. A second electronic control acts in conjunction with the switch when the transmission is in a safe condition for engine starting to prevent the first electronic control from shorting the ignition. Once the engine is running, a voltage-sensitive memory element prevents the first electronic control from shorting the ignition regardless of the condition of the transmission-operated switch. While this arrangement assured a safe start, continued operation was possible even if the operator left the vehicle. Additional prior art is referenced in the earlier Howard U.S. Pat. No. 3,726,265. A condition where the operator can leave a machine, such as riding lawn mower, while the transmission is in gear or the cutting blade is being powered by the engine is generally regarded as unsafe.

SUMMARY OF THE INVENTION

The present invention provides a safety interlock for an operator-controlled machine driven by an internal combustion engine that has a magneto ignition system. The term "magneto ignition system" is intended to include any ignition system that generates electrical energy using a relatively moving magnet and coil, including solid state ignition systems that do not use a condenser and points. The interlock (1) prevents starting of the engine if either a drive transmission or other driven output, such as a power takeoff, of the machine is "in gear," i.e., conditioned to power the machine or an implement of the machine; (2) allows the engine to start regardless of whether the operator station is occupied, as long as the drive transmission is "out of gear" and any other powered implements are disengaged from the power source; (3) allows the engine to continue running after start up regardless of the condition of the drive transmission and power takeoff, if the operator station is occupied; and (4) allows the engine to continue running with the operator station unoccupied if the drive transmission is "out of gear" and any other powered implements are disengaged from the power source.

The above features are obtained with an electrical circuit that is connected across the primary ignition coil of the magneto ignition and is also connected to condition- or position-responsive switches associated with the machine transmission and operator station, as well as with any powered machine implement that would be unsafe if operable upon starting the engine or if operable in the absence of an operator at the controls of the machine. In the preferred embodiment, a first switch or a series of first switches are individually operated when the drive transmission is engaged and when any powered implement is engaged, and a second switch is operated when an operator occupies the operator station. A first control element in the circuit disables the engine ignition when an attempt is made to start the engine if a first switch has been operated, but the condition of the second switch has no effect. A second control element in the circuit disables the ignition when the engine is running if a first switch has been operated and the second switch has not been operated to indicate the presence of an operator at the controls of the machine. An element in the circuit, sensitive to running of the engine, prevents the condition of any first switch from affecting engine ignition apart from the second switch during running of the engine. Advantageously, the first and second control elements are solid state switches, typically silicon controlled rectifiers, that are rendered conductive to disable the ignition, and the circuit is energized solely from the electrical pulses created by the magneto ignition.

With the interlock connected, for example, to a riding lawn mower, first switches connected in series are operated separately in response to the transmission control to the traction drive and to the control for the power takeoff to the cutting blade, and a second switch is operated by movement of the mower seat when occupied. The engine can be started with the operator on or off the seat as long as the transmission is in neutral and the power takeoff disabled. This is important for recoil start engines. Once started, the engine will continue running when the transmission and/or power takeoff are engaged, unless the operator leaves the seat, either purposefully or accidentally. Thus, to leave the machine without stalling it, the operator must disengage the transmission and power takeoff. As a result of the above conditions, the safety interlock assures safe operation or shut down.

The above and other features and advantages of the invention will become more apparent as the invention becomes better understood from the detailed description that follows, when considered in connection with the accompanying drawings.

DETAILED DESCRIPTION

Figure 1:
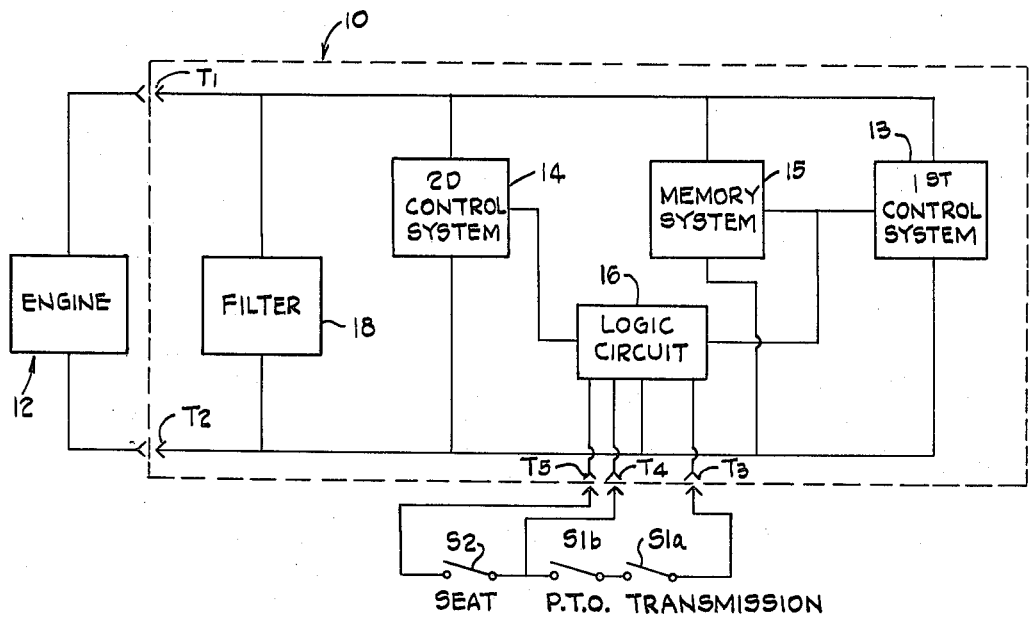
FIG. 1 is a block diagram of the electrical circuits comprising the interlock system of the present invention.

With reference to FIG. 1, a block diagram indicates the functional circuit components of a safety interlock 10 embodying the present invention. The interlock is particularly useful on a machine, such as a riding lawn mower or the like (not shown) that includes an internal combustion engine 12 having a magneto ignition, having first safety switches S1a, S1b associated with the traction transmission and power takeoff of the machine, respectively, and a second safety switch S2 associated with an operator's seat of the machine. The switches S1a, S1b, and S2 are sensitive to the condition of the transmission, power takeoff, and seat; for example, switch S1a is sensitive to the position of a transmission element such as the shift lever, switch S1b is sensitive to a control element such as the actuating lever for the power takeoff, the switch S2 is sensitive to the position of the seat, which changes when subjected to the weight of an operator. For convenience, the interlock will be specifically described in its application to such a riding mower. It should be understood, however, that the interlock can be used to control the mode of operation of other machines or vehicles having an operator station and mechanical drive and that are powered by internal combustion engines having magneto ignitions.

The safety interlock 10 is connected to the engine 12 through electrical terminals T1, T2 and to the switches S1a, S1b, and S2 through electrical terminals T3, T4 and T5. Typically, the interlock circuitry is housed in a cup-like container with circuit elements imbedded in a suitable potting compound and with snap on or plug in terminals for connection.

As indicated in FIG. 1, a first control system 13 is connected to the magneto ignition coil of the engine 12. The first control system is operable to disable the ignition when a control element of the system is in a first condition, more particularly, when it is electrically conductive. A second control system 14 is connected to the magneto ignition coil of the engine 12 in parallel with the first system and is also operable to disable the ignition when in a first condition, more particularly, when it is electrically conductive.

A system 15, sensitive to running of the engine above the starting r.p.m., and in that sense a "memory" system, is electrically connected to the ignition coil of the engine 12 and to the first control system 13. The system 15 renders the first control system inoperable once the engine 12 is running.

A logic circuit 16 is connected to the first and second control systems 13, 14 and to the safety switches S1a, S1b, S2, and governs the operation of the first and second control systems to achieve disabling of the engine in accordance with a mode of safe operation. A filter 18 is connected across the ignition coil to compensate for changes in the ignition primary coil, should the ignition condenser weaken or start to fail from age.

In the operation of the preferred safety interlock 10, the transmission switch S1a and the power takeoff S1b are open when the transmission and power takeoff are operative, i.e., in a condition to transmit power from the engine to driven elements of the machine, specifically the wheels and cutting blade of a riding mower. The switch S2 is closed when an operator is at the operator station, such as in the seat of a riding mower.

Figure 2:
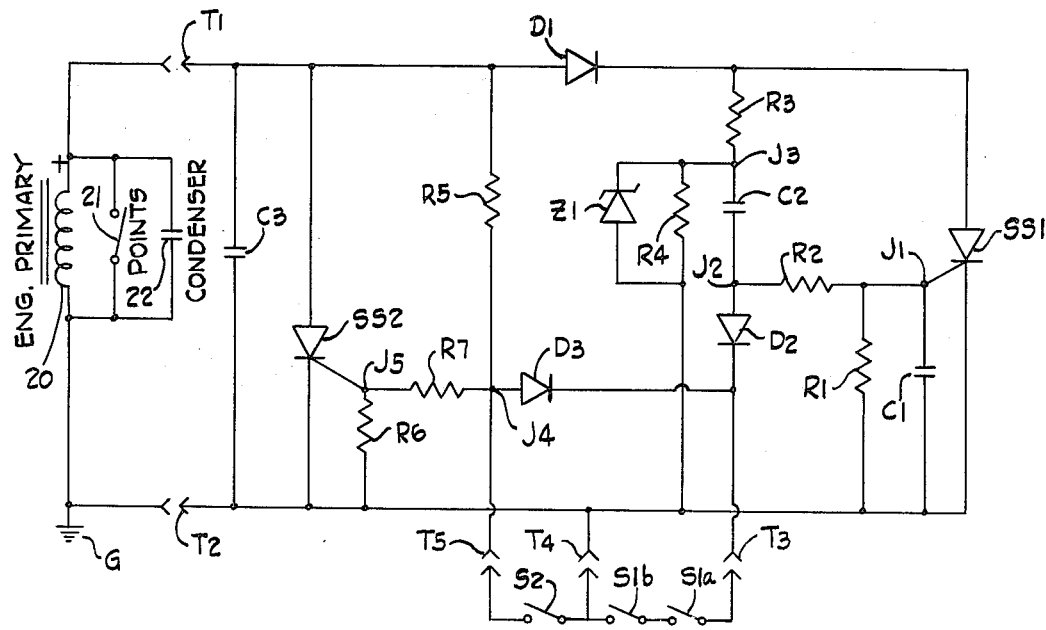
FIG. 2 is a schematic wiring diagram of the safety interlock system of the present invention.

The electrical circuits forming the components of the interlock 10 of FIG. 1 are shown in diagrammatic form in FIG. 2. Also shown is the engine magneto ignition primary coil 20 with points 21 and a condenser 22 in parallel across the coil, connected to the terminals T1, T2 of the interlock, and with the side of the coil 20 connected with terminal T2 also connected to ground potential at G.

A solid state switch, specifically a silicon controlled rectifier, SS1, forming the operative element of the first control system 13, is connected through its anode to the cathode of a diode D1, through its cathode to the terminal T2, and through its gate to a circuit juncture J1. The anode of the diode D1 is connected to the terminal T1. A resistor R1 and a capacitor C1 are connected in parallel between the juncture J1 and the terminal T2. A resistor R2 is connected between a juncture J2 and the juncture J1.

A resistor R3 and a condenser C2, forming a part of the memory system 15, are connected between the cathode of the diode D1 and the juncture J2. The anode of the diode D2 is connected to the juncture J2 and the cathode is connected to the terminal T3. A resistor R4 is connected to a juncture J3 between the resistor R3 and the capacitor C2, and to the terminal T2. A Zener diode Z1 is connected across the resistor R4.

A resistor R5 is connected between the terminal T1 and a juncture J4, which in turn is connected to the terminal T5.

A solid state switch, specifically a silicon controlled rectifier, SS2, forming the primary control element of the second control system 14, is connected through its anode to the terminal T1, through its cathode to the terminal T2, and through its gate to a juncture J5. A resistor R6 is connected between the juncture J5 and the terminal T2. A resistor R7 is connected between the juncture J5 and the juncture J4.

The anode of a diode D3 is connected between the juncture J4 and the cathode of the diode D2.

The switches S1a and S1b are connected in series between the terminal T3 and T4, and the switch S2 is connected between the terminals T4 and T5. Terminal T4 is connected to terminal T2 through the interlock circuit, and terminal T5 is connected to the juncture J4.

A filter capacitor C3 is connected between the terminals T1 and T2.

Suitable values for the components referred to above for use with commercial magneto type engines, such as the type used on riding lawn mowers and the like, are indicated in the table below:

TABLE

| Component | Value |
|---|---|
| Resistor R1 | 100 Ohms |
| Resistor R2 | 150 Ohms |
| Resistor R3 | 1K Ohms |
| Resistor R4 | 3.3 Megohms |
| Resistor R5 | 4.7K Ohms |
| Resistor R6 | 100 Ohms |
| Resistor R7 | 1K Ohms |
| Condenser C1 | .00015 Microfarads |
| Condenser C2 | 4.7 Microfarads |
| Condenser C3 | .002 Microfarads |
| Zener Diode Z1 | 7.5 volts |

In operation, the circuits described above (1) serve to short the primary ignition coil if either switch S1a or S1b is open when an attempt is made to start the engine 12, (2) allow starting of the engine regardless of the condition of the switch S2, and (3) prevent disabling of the ignition primary coil if switches S1a or S1b are opened after starting of the engine, as long as the switch S2 is closed. Thus, the circuits prevent starting of the engine if either the traction transmission or the power takeoff is engaged, and prevent continued operation if either the transmission or power takeoff is engaged and the operator falls from or otherwise leaves the seat. The circuits are designed to allow the engine to run at the lowest r.p.m. of which it is capable without prematurely reacting as if the engine has stopped, thereby disabling the ignition and causing the engine to stall under load. Yet, the circuits will revert to a condition that disables the ignition within a time interval too short to permit the restarting of a stalled engine while the transmission is in gear.

Assuming either the power takeoff or traction drive transmission is engaged, so that either switch S1a or S1b is open, and the engine 12 is not running, the silicon controlled rectifier SS1 will be in its normally nonconductive condition and will remain so until a voltage is applied to its gate. The engine is mechanically cranked and an initial electrical pulse is produced by the primary winding 20 of the magneto. A negative portion of the voltage pulse is used to induce the spark pulse in the secondary winding of the magneto, and is applied to the terminal T2, resulting in a potential at T1 which is positive with respect to the terminal T2. With either switch S1a or S1b open, the increasing voltage of the pulse passes through the diode D1 and the resistor R3, and begins to charge the capacitor C2. The voltage drop across the resistor R3 is high enough to prevent loading the primary coil of the ignition and the resistance R3 also limits the total impedance of the system. The diode D1 prevents a discharge from the capacitor C2 back through the ignition primary. The charging current through the capacitor C2 is applied through the resistor R2 to the juncture J1 and hence the gate of the silicon controlled rectifier SS1, causing the SCR to conduct and thereby short the ignition primary coil 20 to ground, preventing engine start. The resistor R1 assures an adequate voltage at the juncture J1 to be certain the SCR is switched to a conductive condition and assures its stable operation. The SCR SS1 is rendered conductive early during the generation of the pulse, because only a low potential is required for switching. Consequently, the SCR conducts before the potential between T1 and T2 is of substantial magnitude.

If the traction transmission is in neutral and the power takeoff not engaged for operating an implement or the like, i.e., both switches S1a and S1b are closed, the charging current to the capacitor C2 is shunted to ground G through diode D2, contact T3, switches S1a and S1b, and through contacts T4 and T2. As a result, juncture J1 does not experience a voltage rise and the SCR SS1 remains in its nonconductive condition. A substantial voltage therefore exists across the engine primary coil and the coil, points 21 and condensor 22 all function to fire the spark plug, starting the engine.

The resistor R2 is part of a divider network to prevent accidental switching of the SCR SS1 to a conductive condition, should there be any resistance in the transmission or power takeoff switches S1a and S1b. The capacitor C1 also prevents accidental switching of the SCR SS1 from radio frequency interference picked up from the outside leads to the circuit.

Both of the starting conditions described above are independent of the condition of switch S2 and hence are independent of the presence or absence of an operator at the operating station, such as at the seat of a riding mower. Thus, a mower can be started with the operator in a seat or out of the seat as long as the transmission and power takeoff are disengaged.

Once the engine 12 is running, the capacitor C2 is charged to a desired voltage level, in the preferred embodiment to a level of 7.5 volts, as determined by the clamping action of the Zener diode Z1. The resistor R4 provides a discharge path for the capacitor C2 when the engine is turned off, but has sufficient resistance to prevent discharging of the capacitor C2 between magneto pulses while the engine is running. Once the capacitor C2 is charged, it prevents current flow from the ignition pulses to the junctures J2 and J1, and the SCR SS1 cannot be switched to its conductive condition, regardless of the condition of the switches S1a and S1b associated with the traction transmission and the power takeoff. Thus, after the engine has been started in a safe condition in which the transmission and power takeoff must be disengaged, either or both can thereafter be engaged without affecting the operation of the magneto ignition.

To insure safe operation of the machine after the engine is running, the switch S2, indicative of the presence of an operator at the operating station, must be closed any time the transmission of power takeoff is engaged (i.e. any time the switch S1a or S1b is open). Thus, in the described embodiment, the switch S2, associated with the seat of a riding mower, prevents the operator from leaving the seat while the transmission or power takeoff is engaged. With the switch S2 closed, the voltage appearing at the juncture J4 will be applied to ground through terminal T5, switch S2, terminal T4 and terminal T2. This will prevent a voltage from being applied to the juncture J5 associated with the silicon controlled rectifier SS2, which is in its nonconductive condition, allowing the engine to continue to run. Should the operator attempt to leave the seat with the transmission or power takeoff engaged (switch S1a or S1b open), the switch S2 will open and the voltage at juncture J4 will be applied through the resistor R7 to the juncture J5 and to the gate of the SCR SS2, causing the SCR to change from its normally non-conductive condition to a conductive condition in which it will short the ignition primary coil 20 to ground, causing the engine to stop. If the operator should momentarily bounce in the seat, thereby momentarily opening switch S2, the engine will begin to shut down through the SCR SS2, but will not stop completely, providing the engine has not reduced its r.p.m. to below a normal starting r.p.m.

In the starting mode, in which transmission and power takeoff switches S1a and S1b are closed, the diode D3 connected between the juncture J4 and the terminal T3, being of relatively low resistance in comparison to the resistor R7, prevents the voltage at J4 from switching the SCR SS2 to a conducting condition, by virtue of the circuit to ground through the diode D3, contact T3, switches S1a and S1b, and terminals T4 and T2.

The resistors R6 and R7 constitute a voltage divider of approximately a 10:1 ratio to prevent the voltage drop across the diode D3, or the voltage drop across any resistance of the switch S2, from switching the SCR SS2 to its conductive condition while the ignition is running.

Any interaction between the SCRs SS1 and SS2 is prevented by the diodes D2 and D3. The gate voltage of the SCR SS2 is blocked from reaching the gate of SCR SS1 by the diode D2, when the seat switch S2 is open.

If the ignition condenser 22 should start to fail, the capacitor C3 will compensate for changes in the ignition pulse and assure good characteristics of voltage change with respect to time and good SCR operation.

The switches S1a, S1b and S2 are arranged with the circuits of the interlock 10 through the contacts R3, T4, T5 in a sensor loop arranged so the system is fail-safe, should any one of the switches become disconnected. That is, if either switch S1a or S1b becomes disconnected, the resulting condition is the same as if the switch were opened through engagement of the transmission or power takeoff, and will prevent starting. If the switch S2 becomes disconnected, the condition is the same as if the operator is out of the seat and the engine will be stopped upon the engagement of either the transmission or power takeoff. It will be appreciated that other switches can be added to the sensor loop to provide additional safety. For example, on machines requiring a grass catcher, an additional switch can be added in series with switches S1a and S1b between terminals T3 and T4 that will prevent engine start unless the grass catcher is in place.

While the present invention has been described with particularlity, it will be understood that various modifications and alterations may be made therein without departing from the spirit and scope of the invention set forth in the appended claims.

What is claimed is:

1. In a vehicle driven through a transmission to a traction drive by an internal combustion engine that has a magneto ignition system and that has a seat occupied by a driver, a seat-operated switch that is closed when the seat is occupied and a transmission-operated switch that is open when the transmission is engaged, an electrical circuit connected between said swtiches and across a primary winding of the magneto ignition, said circuit including means for selectively shorting the primary winding when the engine is not running and the transmission-operated switch is open, and means for shorting the primary winding when the engine is running and both the seat-operated switch and the transmission-operated switch are open.

2. In a machine driven by an internal combustion engine that has a magneto ignition system and having at least two switches, each separately operable, a first switch indicative when open of power transmission from the engine to a movable part of the machine and a second indicative when closed of operator-presence at controls of the machine, a safety interlock comprising: a first control selectively operable to disable the ignition to prevent start of the engine, dependent upon the condition of the first swtich and independent of the condition of the second switch; a second control selectively operable to disable the ignition to prevent engine running after start, dependent upon the condition of both the first and second switches; and means, activated in response to running of the engine, for preventing the condition of the first switch from affecting engine ignition apart from the second switch during running of the engine.

3. In a machine driven by an internal combustion engine that has a magneto ignition system and having at least two safety switches, each separately operable, a first safety switch indicative of power transmission from the engine to a movable part of the machine and a second indicative of operator presence at controls of the machine; a safety interlock comprising electrical circuitry including: a first solid state switch selectively operable to short the ignition to prevent start of the engine, dependent upon the condition of the first safety switch and independent of the condition of the second safety switch; a second solid state switch selectively operable to short the ignition to prevent engine running after start, dependent upon the condition of both the first and second safety switches; and means, activated in response to running of the engine, for preventing the condition of the first safety switch from affecting engine ignition apart from the second safety switch during running of the engine.

4. In a machine driven by an internal combustion engine that has a magneto ignition system and having at least two switches, each separately operable, a first switch indicative of operator presence at controls of the machine and a second indicative of power transmission from the engine to a moving part of the machine, a safety interlock comprising: a first solid state switch selectively operable to short the ignition to prevent start of the engine, dependent upon the second switch indicating transmission of power to the machine and independent of the condition of the first switch; a second solid state switch selectively operable to short the ignition to prevent engine running after start, dependent upon the second switch indicating transmission of power to the machine and the first switch failing to indicate presence of an operator at the controls; and memory means, activated in response and sensitive to running of the engine, for preventing the condition of the second switch from affecting engine ignition apart from the first switch during running of the engine.

5. In a machine operated selectively through a transmission by an internal combustion engine that has a magneto ignition system having a primary winding that can be shorted to prevent ignition, the machine having a station to be occupied by an operator and a safety interlock for controlling the starting and running of the engine, said interlock comprising: a first switch means connected across a primary winding of the ignition system, normally nonconductive and capable of being rendered conductive by an electrical signal; a second switching means connected across the primary winding, normally nonconductive and capable of being rendered conductive by an electrical signal; a first control circuit for said first switching means, including first safety switch means for actuation in response to the condition of the transmission driven by said engine, said first safety switch means having a first non-conductive condition that allows the first switching means to become conductive upon engine starting and a second conductive condition that prevents it from becoming conductive, and circuit means responsive to running of the engine to prevent the first switching means from becoming conductive while the engine is running; a second control circuit including said first safety switch means and a second safety switch means for actuation in response to the condition of the station to be occupied by an operator, said first safety switch means in its second condition preventing the second switching means from becoming conductive, and said second safety switch means having a first conductive condition that prevents the second switching means from becoming conductive and a second non-conductive condition that allows the second switching means to become conductive if the first safety switch means is in its first condition; whereby the ignition system is disabled when (a) the engine is not running and the first safety switch means is in the first condition, and (b) the engine is running and the first safety switch means is in the first condition and the second safety switch means is in the second condition.

6. In a machine driven by an internal combustion engine that has a magneto ignition system and having at least two switches each separately operable, a first switch that is open when a power transmission from the engine to a movable part of the machine is engaged and a second switch that is closed when an operator is present at the operating controls of the machine; a safety interlock comprising: a first electronic control operable to disable the ignition to prevent start of the engine dependent upon the condition of the first switch and independent of the condition of the second switch; a second electronic control operable for stopping the running of the engine after start in response to a condition of both the first and second switches; said first electronic control operating independently of said second electronic control in preventing start of the engine and said second electronic control operating independently of said first electronic control in stopping the running of the engine after start; and means preventing operation of said first control during running of the engine.

7. In a machine driven by an internal combustion engine that has a magneto ignition system and having at least two switches, each separately operable, a first switch indicative when open of power transmission from the engine to a moving part of the machine and a second indicative when closed of operator presence at controls of the machine, a safety interlock comprising: a first solid state switch selectively operable to short the ignition to prevent start of the engine, dependent upon the first switch indicating transmission of power to the machine and independent of the condition of the second switch; a second solid state switch selectively operable to short the ignition to prevent engine running after start, dependent upon the first switch indicating transmission of power to the machine and the second switch failing to indicate presence of an operator at the controls; and memory means, including a capacitor, activated in response and sensitive to running of the engine, for preventing the condition of the first switch from affecting engine ignition apart from the second switch during running of the engine.

* * * * *